S. C. COX.
COLLECTING VEHICLE.
APPLICATION FILED APR. 6, 1912.

1,045,109.

Patented Nov. 19, 1912.

2 SHEETS—SHEET 1.

WITNESSES

INVENTOR
Samuel C. Cox
By Hodges & Hodges
Attorneys

S. C. COX.
COLLECTING VEHICLE.
APPLICATION FILED APR. 6, 1912.
1,045,109.
Patented Nov. 19, 1912.
2 SHEETS—SHEET 2.
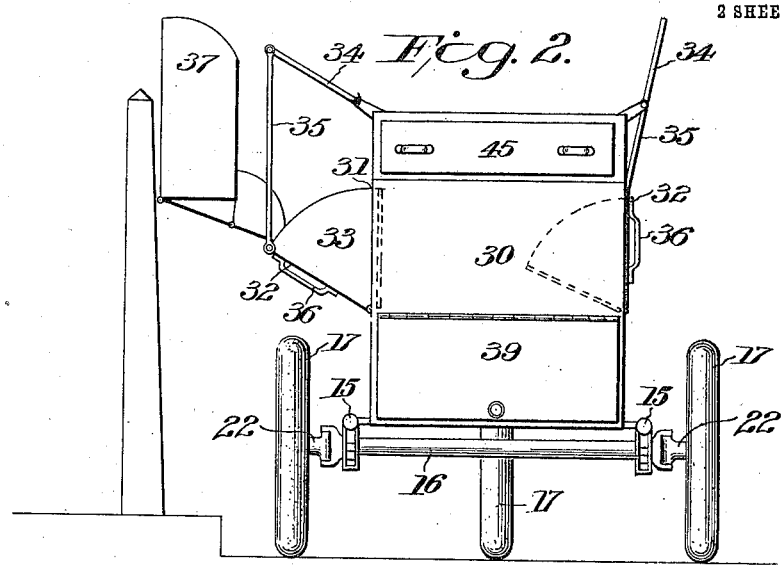
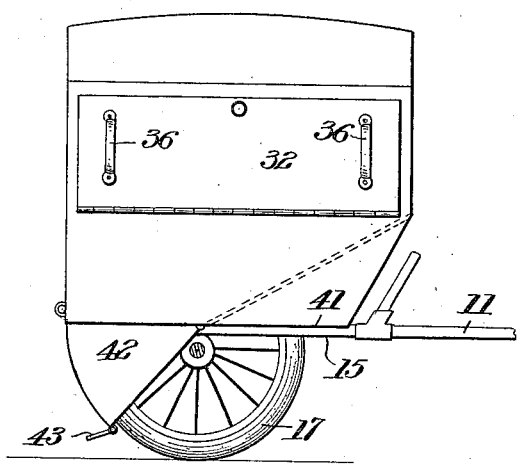
WITNESSES
INVENTOR

UNITED STATES PATENT OFFICE.

SAMUEL C. COX, OF WASHINGTON, DISTRICT OF COLUMBIA.

COLLECTING-VEHICLE.

1,045,109.  Specification of Letters Patent.  Patented Nov. 19, 1912.

Application filed April 6, 1912. Serial No. 689,057.

*To all whom it may concern:*

Be it known that I, SAMUEL C. COX, a citizen of the United States residing at the city of Washington, District of Columbia, have invented new and useful Improvements in Collecting-Vehicles, of which the following is a specification.

This invention relates to certain new and useful improvements in collecting vehicles, designed particularly for use in connection with the collection of mail matter, although I do not desire to limit myself in this particular.

One of the objects of the invention is to provide a suitable vehicle propelled in any preferred manner, as for instance a motor vehicle, and to equip the same with a suitable storage receptacle, whereby the vehicle may travel from place to place for the collection of articles, such as mail matter, and may transport the same to a central station.

A further object is to provide improved means whereby the articles to be collected may be readily and conveniently deposited in the receptacle.

A further object is to provide improved means for emptying the storage receptacle.

A further object is to provide means for protecting the articles from damage in inclement weather while being deposited within the receptacle.

My invention will be hereinafter fully set forth and particularly pointed out in the claims.

Figure 1:
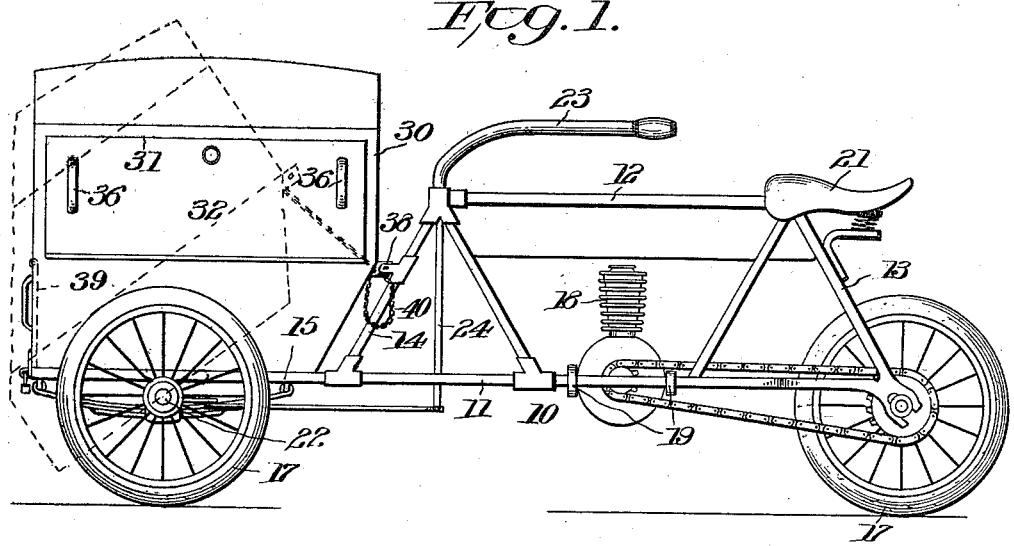
Figure 3:
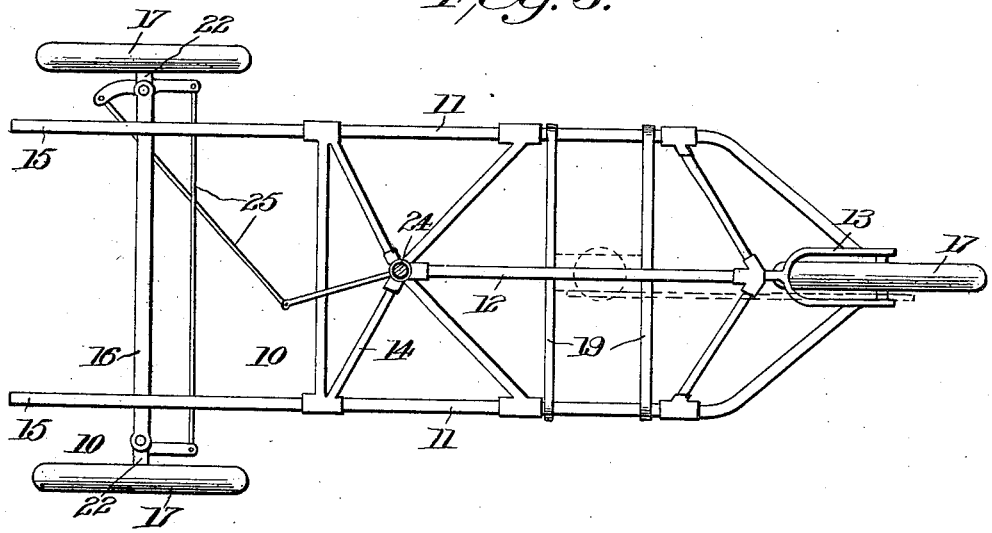

In the accompanying drawings:—Figure 1 is a side elevation of a collection vehicle embodying my invention. Fig. 2 is a front end view thereof, illustrating the method of depositing articles within the receptacle. Fig. 3 is a top plan view. Fig. 4 is a side elevation of a slight modification.

Referring to the drawing, 10 designates a vehicle formed of side bars 11 and a backbone 12, united by a rear fork 13 and a forward truss-like brace 14. Said brace 14 comprises two members separated at their lower ends and secured to opposite side bars 11, the upper ends of said members converging into approximate inverted V-shape and being joined to the backbone 12. The side bars 11 are provided with extensions 15 projecting forwardly from the brace 14, which extensions serve to support the axle 16, the latter being supported by carrying wheels 17. A single drive wheel 17' is mounted in the rear fork 13, the lower portion of said fork being braced by converging portions of the side bars 11. The wheel 17' may be rotated in any preferred manner. In the drawings I have shown an engine 18 of the explosive type supported by suitable hangers 19 and operatively connected with said wheel. A saddle 21 is provided for the support of the operator. The wheels 17 are mounted on stub axles 22 pivotally connected with the axle 16 and are steered by means of a handle bar 23 mounted upon a suitable steering shaft 24, the lower end of which is connected with the stub shafts or axles 22, by connecting rods 25.

Supported by the extensions 15 of the side bars is a box or receptacle 30 of any suitable or preferred contour. As illustrated the box is substantially rectangular in plan view and provided with inlet openings 31, one in each side and extending substantially the length of the bix. Each opening is normally closed by means of a cover 32 hinged at its lower edge to the lower edge of the opening, the outward movement of the cover being limited by a suitable stop, preferably formed by providing the cover with end wings 33 having abutments adapted to engage the end edge of the contiguous opening. Pivoted to the opposite sides of the receptacle and near the top thereof, are rain guards 34, the outer edge of each rain guard being connected with the outer edge of the cover 32 directly beneath the same, by means of connecting rods 35. The covers are each provided with a handle 36 for convenient manipulation, and it is obvious that as the cover is moved to cover or uncover the contiguous opening 31, the rain guard 34 connected therewith is moved in a similar manner, as best illustrated in Fig. 2, in which the parts are shown in the act of transferring mail matter from a street letter box 37 to the receptacle 30. When either cover has been closed the rods 35, through the weight of the contiguous rain guard 34, act to lock the said cover against accidental opening. Said covers and rain guards also coöperate to form chutes for directing articles into the receptacle, when the openings 31 are uncovered.

In Fig. 1 I have shown the receptacle 30 as pivotally mounted with respect to the frame 10, the receptacle being held in horizontal position by means of a suitable locking device 38 arranged to engage the brace 14. In this form of box the door 39 is pivoted at its upper edge and is unlocked and allowed to swing when the receptacle is dumped. A chain or other flexible device 40 serves to limit the dumping movement of the box. When the box is moved into a horizontal position the door 39 will automatically close.

In Fig. 4 the receptacle is shown as provided with a drop bottom for convenient emptying of the receptacle. As illustrated the bottom 41 is provided with a pivoted section 42 which is normally held in closed position by means of a suitable lock 43, and when released from said lock said bottom will drop, permitting a discharge of the contents of the receptacle.

In practice, the vehicle is propelled from place to place for the collection of any desired articles, such for instance as mail matter. In the latter instance the vehicle is brought alongside of a street letter box and the cover 32 contiguous thereto is swung to uncover the opening 31. The same movement swings the rain guard 34 downwardly in a position to protect the mail matter as it is being transferred and also to prevent moisture, in the event of inclement weather, from entering the receptacle. After the receptacle is filled the vehicle is propelled to a central station where it is emptied of its contents, either by releasing the drop bottom illustrated in Fig. 4, or by dumping as illustrated in Fig. 1. It will be noted that irrespective of the method of emptying the receptacle, the rear end of the latter is provided with an inclined portion which seats against the forward bars of the braces 14. If desired I may also provide the upper part of the receptacle with a drawer 45 which may be employed to receive mail or other articles for delivery when the vehicle leaves the central station; or which may be placed beneath the receptacle to receive the contents discharged by the latter at the central station.

Having thus explained the nature of my invention and described an operative manner of constructing and using the same, although without attempting to set forth all of the forms in which it may be made, or all of the forms of its use, what I claim is:—

1. A mail collection vehicle comprising a vehicle frame, a closed receptacle carried by said frame and provided with inlet openings and a discharge opening, outwardly movable closures for said inlet openings, said closures when in open position projecting beyond the wheels of the vehicle to span the space between the street letter box and the receptacle, whereby inlet chutes are formed, a pivoted closure for said discharge opening, and means for maintaining said closures in closed position.

2. A mail collection vehicle comprising a vehicle frame, a closed receptacle pivotally supported by said frame and provided with inlet openings and a discharge opening, outwardly movable closures for said inlet openings, said closures when in open position projecting beyond the wheels of the vehicle to span the space between a street letter box and the receptacle, whereby inlet chutes are formed, means for maintaining said closures in closed position, a pivoted closure for said discharge opening, and means for normally maintaining said receptacle in horizontal position on said frame, whereby the closure for the discharge opening will also be closed.

3. A mail collection vehicle comprising a vehicle frame, a closed receptacle carried thereby and having inlet openings and a discharge opening, closures for said inlet openings, and gravity operated means for maintaining the inlet closures in either open or closed position.

4. A collection vehicle comprising a vehicle frame, a closed receptacle carried thereby and provided with inlet openings, covers for said openings, rain guards carried by said receptacle, and connections between said covers and rain guards.

5. A collection vehicle comprising a vehicle frame, a closed receptacle carried thereby and provided with inlet openings, covers hinged at their lower edges to said receptacle adjacent the lower edges of said openings, rain guards hinged to said receptacle above said openings, and connections between said covers and said rain guards.

6. A collection vehicle comprising a vehicle frame, a closed receptacle carried thereby and provided with inlet openings, covers for said openings, rain guards carried by said receptacle, and means connected with said rain guards for locking said covers.

In testimony whereof I have hereunto set my hand in presence of two subscribing witnesses.

SAMUEL C. COX.

Witnesses:
  WM. S. HODGES,
  H. JOSEPH DOYLE.